United States Patent [19]

Newell

[11] Patent Number: 5,066,527

[45] Date of Patent: Nov. 19, 1991

[54] SORPTIVE ARTICLE

[75] Inventor: Robert D. Newell, Roxboro, N.C.

[73] Assignee: Newell Industry International, Roxboro, N.C.

[21] Appl. No.: 471,110

[22] Filed: Jan. 26, 1990

[51] Int. Cl.⁵ ............................................. B27M 3/00
[52] U.S. Cl. .................................. 428/35.6; 15/229.1;
428/36.1; 428/74; 428/284; 428/299
[58] Field of Search ....................... 428/74, 35.6, 36.1,
428/284, 299; 15/229.1

[56] References Cited

U.S. PATENT DOCUMENTS

| 4,448,832 | 5/1984 | Kidwell | 428/221 |
| 4,717,616 | 1/1988 | Harmon et al. | 428/195 |
| 4,923,738 | 5/1990 | Newell | 428/221 |
| 4,929,480 | 5/1990 | Midkyf et al. | 428/74 |
| 4,967,758 | 11/1990 | Masciarotte | 428/74 |

OTHER PUBLICATIONS

Fall 1989 catalog of New Pig Corporation.
Material Safety Data Sheets and Related Advertising Material of New Pig Corporation.

Primary Examiner—James J. Bell
Attorney, Agent, or Firm—Olive & Olive

[57] ABSTRACT

A sorptive article that is made of one or more fibrous web elements enclosed within a fibrous web casing and that may be used for absorbing liquid material.

22 Claims, 2 Drawing Sheets 5,066,527

SORPTIVE ARTICLE

BACKGROUND OF THE INVENTION

1. Cross Reference

Co-pending patent application Ser. No. 07/189,484, of Robert D. Newell, filed May 2, 1988, now U.S. Pat. No. 4,923,738, and entitled "Interstitially Capacitive Absorptive Articles".

2. Field of the Invention

This invention relates generally to a fluid-sorptive article, and more specifically to an absorbent tube containing one or more fibrous webs that may be used to take up and contain fluids.

3. Description of the Related Art

Absorbent socks comprised of stretched polyester and containing either agricultural cellulose in a free-flowing particulate form or containing particles of magnesium aluminosilicate or other particulate materials have been used to absorb and contain oils and non-aggressive fluids (PIG ®, New Pig Corporation, Tipton, Pa). Although such absorbent socks provide a contained, efficient way of absorbing hydraulic fluids, PCB's, and other substances to be cleaned from an environment, they also contain particulate inner material that may cause a problem of excessive dust and require use of a dust mask if a spillage from the sock occurs.

Other prior measures for absorbing leaked or spilled fluids have utilized clay, towels, buckets or cans. The problem with each of these methods relates to the difficulty and/or the expense of handling the oil-containing material or the container. Substances such as clay also have a lower absorbency than methods used in the commercial Pig ® products.

It is well known that many fibrous or fabric substances absorb liquids to some extent. Such substances as cotton fiber and natural cellulose products absorb liquid more efficiently than many man-made fibers which cannot absorb water at all, but rather must rely on their capillary reaction to liquids. Thus, such synthetic fibrous yarns must be sufficiently porous to permit the moisture to diffuse between the fibers and be held between the fibers in a cleaning manner. These synthetic fibers, however, are often preferred for many other uses because of their strength, their high wearability and their limited shrinkage.

Desirable characteristics of fibrous webs or fibrous structures in enhancing fluid absorption include: high durability and resistance to abrasion; high absorption characteristics such as are shown by soft, loosely twisted yarns; ready dryability; high wet tensile strength; and the ability to withstand repeated laundering without shrinking significantly.

U.S. Pat. No. 4,717,616 issued Jan. 5, 1988 to Harmon, discloses a mop head fabric construction that comprises a plurality of substantially parallel, abutting strands of textile material such as cords of twisted strands or yarns. Absorption in this product is accomplished through the use of capillary action exhibited by the very finely divided fibrous structures which possess a low fluid pick-up and retention capacity per unit volume, thereby physically limiting the amount of fluids that can be absorbed. These fibrous structures are limited in absorption capacity because of their large surface area per unit volume retained, and the wringability and dryability of these fibers.

Applicant's co-pending application U.S. application Ser. No. 07/189,484 filed May 2, 1988 discloses the surprising and unexpected discovery that interstitially capacitive regions may be employed to contain liquids and/or fluids or mixtures of fluids and particulates within a three-dimensional framework, e.g., fabric structure, which is capable of retaining the fluids by surface tension forces and capacitance between the individual legs of the structure of the fabric. These capacitive interstitial regions of the sorptive structures of the invention of the co-pending application also are desirable in that they release fluids more easily than conventional absorptive materials due mainly to the small structural surface area required to contain a droplet of liquid or fluid in the fabric or other fluid sorptive of the invention.

It is therefore an object of this invention to provide an improved sorptive article utilizing fibrous webs.

It is a further object of the invention to provide an improved sorptive article with increased sorptive efficiency.

It is a further object of the invention to provide a sorptive article from which fluid may be easily released.

It is a further object of the invention to provide a sorptive element that may be reused.

It is a further object of the invention to provide a sorptive article that can be made of waste fibrous web substances.

It is a further object of the invention to provide a sorptive element that does not contain dust-producing particulate matter, which could cause problems by littering the environment if the sorptive element were torn or broken open.

It is a further object of the invention to provide a sorptive article that may be an elongated form to surround spills of fluids.

Other objects and advantages of the invention will be more fully apparent from the following disclosure and appended claims.

SUMMARY OF THE INVENTION

The invention is based on the surprising discovery, as discussed in co-pending U.S. patent application Ser. No. 07/189,484 now U.S. Pat. No. 4,923,738, that interstitially capacitive regions may be employed to contain liquids and/or fluids, or mixtures of fluids and particulates within a three-dimensional web framework.

The sorptive article of the invention comprises:

(a) a casing member formed of a liquid permeable material; and (b) at least one fibrous web element interiorly disposed in the casing member to form interstitial spaces capable of holding fluids.

The casing when elongated is preferably closed at both ends. The fibrous web element(s) may be involuted, entangled, twisted, or curvate strands, sheets, pieces and/or fibers of a nonwoven or woven fibrous web material.

In a first preferred embodiment, the plurality of fibrous web elements extend side-by-side in parallel or twisted discrete strand elements from one end of the elongated sorptive article to the other end, and are attached at both ends to the elongate casing member.

In a second preferred embodiment of the invention, a plurality of fibrous web elements is wrapped interiorly and circularly around each other in a circular or folded manner within an elongated casing member, the web elements being attached at both ends to the elongate casing member.

In a third preferred embodiment, the fibrous web elements within the elongated casing member may also be randomly dispersed therein such that fibrous web elements are present throughout the elongated casing member, but in which each fibrous web element does not necessarily extend from one end of the elongated casing member to the other.

In a fourth preferred embodiment, the fibrous web elements may be aligned as in any of the previous embodiments, but are within a flattened casing that may be of any desired shape such as rectangular, oval, round, irregular, etc.

In a fifth embodiment of the invention, the casing member may be open at one or more ends or sides to enable fluids to enter the casing and be taken up by the internal fibrous webs directly at these places without going through the casing.

In a sixth embodiment, a plurality of fibrous web elements is sewn in a series of closely-spaced loops to a backing casing piece, such as a rectangular piece of perforated plastic having means for attachment to a flat-mop handle. A fibrous cover casing may be placed over the loops.

The casing member, as well as the fibrous web elements may be made of a wide variety of materials, including synthetic or natural cellulosic or fibrous woven and nonwoven webs.

Other aspects and features of the invention will be more fully apparent from the following disclosure and appended claims.

DETAILED DESCRIPTION OF THE INVENTION AND PREFERRED EMBODIMENTS THEREOF

Figure 1:
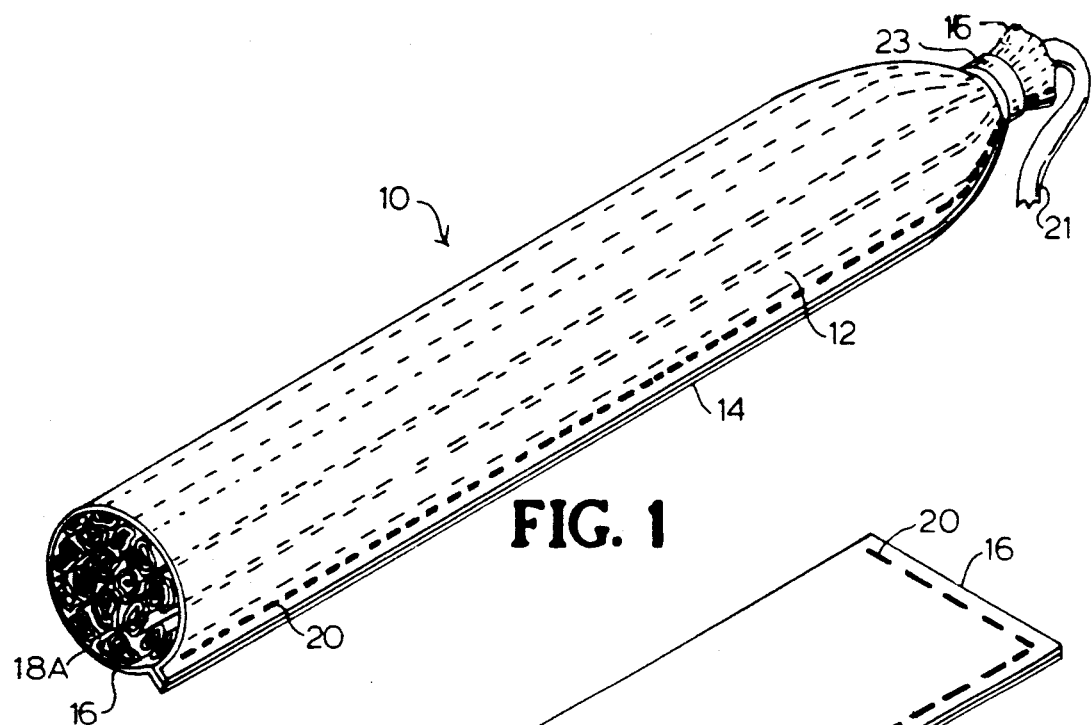
FIG. 1 is a perspective view of one end portion of a first embodiment of the invention having elongated parallel or twisted internal fibrous web strand elements.

The present invention for an elongated sorptive article comprises a casing and interior fibrous web elements or foam elements with interstitial spaces that may be used for absorbing various fluids and liquids and mixtures thereof with particulate substances.

The term "fibrous web" as used herein means a nonwoven or woven fabric, the primary difference between nonwoven and woven fabrics being that in nonwoven fabrics, the individual fibers, rather than yarns, are the basic elements of the structure. Both fabric types may be used in the invention, but nonwoven fabrics are preferred because of their increased absorptive capacity, particularly when treated according to Applicant's copending application and because of their generally lower costs than those associated with woven fabrics. The fibrous web materials may be porous or nonporous.

Nonwoven fabrics consist essentially of fibers, web and binder. The fibers are typically of rayon, nylon, polyester, polypropylene, cotton, wood pulp, olefin, fiberglass or any other long (filament) or short (staple) fibers. The web may be carded, wet, dry, or air formed, air dispersed, melt blown or spunbonded. The binders known in the art include latex, lowmelt fibers, powders, thermally responsive substances, composites and needlepunched substances.

The types of nonwoven bonding systems include adhesive systems, such as melt blown processes where tacky, melted, extruded polymer fibers come in contact with other fibers and stick together; use of chemicals, such as acrylates, in chemical systems such as saturation, and foam or spray bonding: methods using air-pressure and heat, typically used with melted adhesion fibers; needlepunching, where fibers are physically entangled; solvent treatment to make fibers sticky; sonic energy treatment to heat or melt fibers; and water entanglement ("spunlace") where the force of water and/or air streams is used to entangle the fibers.

Fibrous web materials that may be used in the casing or the interior fibrous web include those made of natural fibers, synthetic fibers, and combinations thereof. Thus, natural nonwovens of cotton linters and cotton staple; dissolving pulp; flax, jute or ramie pulp; paper-making pulp or wool; as well as synthetic nonwovens of acetate filament or staple; acrylic filament or staple; aramids; carbon; glass filament or staple; inorganic ceramic; modacrylic filament or staple; nylon filament or staple; polyacetal; polybenzimidazole; polyester filament or staple; polyphenylene sulfide; polypropylene filament or staple; polyvinyl alcohol; rayon filament or staple; spandex and other elastomers; specialty olefins; polyethylene; and vinyon filament and staple, are included within the nonwovens that may be used in the sorvent element of the invention.

A preferred fibrous web material comprises spun-laced nonwoven fabrics. Spun-laced fabrics may be made of precursor webs comprised of 100% polyester or rayon, polyester blends, such as with rayon or wood pulp or other synthetic or natural fibers such as acrylics or olefin or cellulosic fiber. Spun-laced fabrics comprise mechanically interlocked fibers and fiber bundles where the energy causing the fiber interlocking comes from small diameter, high pressure water streams which impinge on a web formed by carding, air laying or wet laying the fibers on a screen or forming wire. Preferred components of the web materials used in the invention for both the casing and the interior are hydroentangled synthetics such as 60% wood pulp or rayon and 40% polyester; cotton-polyester; or cellulosic-polyester.

Other nonwoven materials that may be used include air laid nonwovens, carded and random fiber nonwovens, meltblown nonwovens, needlepunched nonwovens, scrim nonwovens, spunbonded nonwovens, stitchbonded nonwovens, tow nonwovens and wet laid nonwovens.

Another type of nonwoven material that may be used as internal fibrous web material comprises pieces or strips as used to make "highloft" products such as felting, padding, thermal insulating strips, which are typically made of various cellulose and/or synthetic pulps.

In place of, or preferably mixed with, the interior nonwoven material, foam materials having internal interstitial spaces may be used. Foams of cellulosic, polyolefin, polystyrene, polyurethane, and combinations thereof may be placed within an external casing in combination with the pieces of nonwoven materials.

The external casing is preferably comprised of a sheet of fibrous web material formed into a tube such as by sewing or adhesives. Any fibrous web material with sufficient tensile strength to hold together for use in fluid cleanup may be employed.

The internal fibrous web material used in the casing may be in the form of whole or partial sheets, strips of web, or chopped or shredded web pieces. Thus, in the broadest aspect of the invention, any scrap pieces of fibrous web material may be used in the casing. Preferably, the web material is in strips 2-10 inches wide for the first and second embodiments. For the casing, the web material may by any thickness that is sturdy enough to contain the internal fibrous web contain material. Sontara ™ fabric (Du Pont) having a thickness of about 15 mil has been found to work well. For the internal material, any pieces of a thickness and conformation capable of forming interstitial spaces to take up fluids may be used.

In each embodiment of the sorbent element 10 of the invention, the casing 12 preferably comprises a flat sheet of fibrous web material which is formed into a tube or pocket. In the first two embodiments, the casing is preferably closed at both ends (FIGS. 1 and 2 each show one end of an elongated casing that has been cut to show the interior structure). Thus, a rectangular sheet of fibrous web having two longer sides 14 and two shorter sides 16 may be used. The fibrous web element(s) 18 A,B (see below) are positioned along the length of the rectangular sheet and the two longer sides 14 are brought together to enclose the web elements. The long sides 14 may be attached together by stitching 20 or by other attachment means, such as gluing or fusing. The sewing stitches at the end(s) of the casing also may attach the end(s) of some or all of the fibrous web elements to the casing, particularly in the embodiment where the fibrous web elements extend from one end of the casing to the other.

In the first preferred embodiment of the invention, a portion of which is shown in FIG. 1, the casing 12 is elongated and the fibrous web elements 18A comprise a plurality of strands of web material, each of which preferably extends the entire length of the elongated casing (shown by dashed lines extending down the length of casing in FIG. 1). The strands may be roughly parallel to each other or may be twisted about within the casing.

Figure 3:
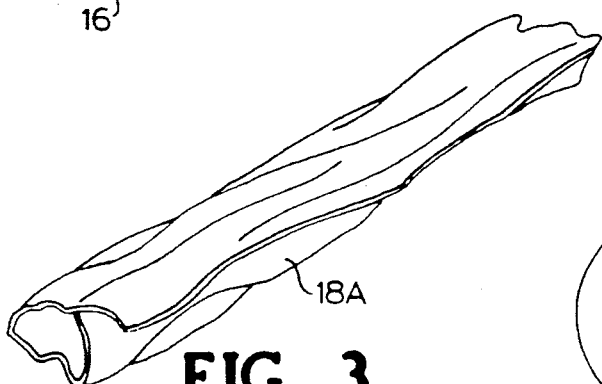
FIG. 3 is a perspective view of the end of a fibrous web strand element according to the first embodiment of the invention shown in FIG. 1.

Prior to placement in the casing, each strand is treated by unidirectional stretching or twisting followed by cessation of such stretching resulting in a continuous, laterally involuted or twisted ribbon creating structurally stable interstitially capacitive spaces with relatively small surface areas, as disclosed by the co-pending application. The unidirectional stretching is preferably applied by imparting collaterally imbalanced stresses to a fibrous web so that not all portions of the web are stretched or twisted to the same extent. Such stretching results in formation of involutions in the web piece, so that the edges of the web roll inward, twist or gather (FIG. 3). Surface winding machines used with skein expanders, may be used to differentially longitudinally stress the web to form involutions. When the laterally involuted structure is placed in proximity to a fluid such as water, organic solvents, oil, etc., its shape provides regions into which the fluid flows by capillarity and surface tension effects.

Other types of stress, as disclosed in the co-pending application, such as heating, use of a peening apparatus, and use of a differentially hydrophilic laminate may be used to impart collaterally imbalanced stress to the web pieces.

A plurality of such stressed fibrous web elements 18A is placed in a casing 12 and, as discussed above, is preferably attached, such as by stitching 20, to the casing 12 at one or both ends of the casing 12. Such attachment holds the web elements 18A within the casing 12 even during the liquid removal as discussed below. The ends of the casing may be rectangular (FIG. 2), or as shown in FIG. 1, may be tapered and held together, such as by a metal clamp 23. One or both of the ends of the casing may have an attached cord or other handle means 21 attached thereto, such as by sewing or stapling, to facilitate handling and placement of the casing at a spill site.

Figure 2:
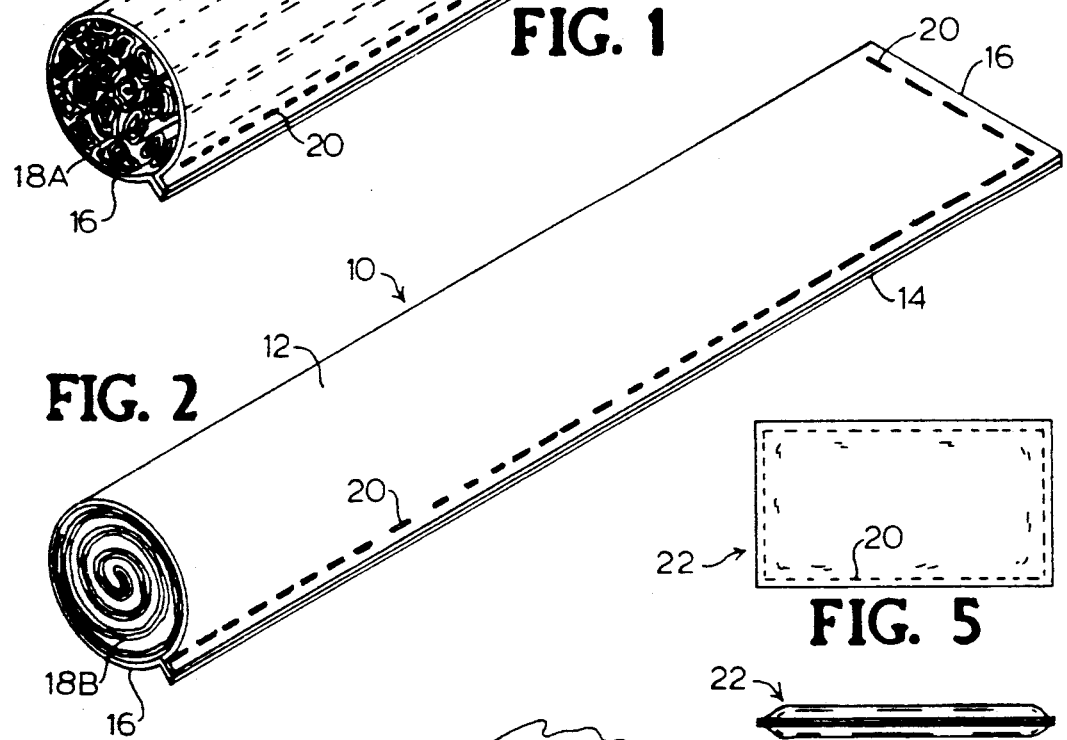
FIG. 2 is a perspective view of an end portion of a second embodiment of the invention having interior fibrous web elements parallelly aligned and rolled within the casing.

In the second preferred embodiment of the invention, shown in FIG. 2, the casing 12 is elongated and the fibrous web elements 18B comprise a plurality of pieces of web material that are arranged in parallel in a stacked arrangement prior to placement in the casing 12. The stack of pieces is then rolled to form a cylinder. Prior to rolling the stack into a cylinder, the stack may be folded one or more times to increase the number of layers being rolled together. As in the first embodiment, the roll of internal web pieces is preferably attached at both ends to the end of the casing 12.

In a third embodiment of the invention, the sorptive element of the invention comprises an elongated casing 12 which contains a plurality of crumpled fragments, torn or chopped segments, felted web fibers, or any other fibrous web material pieces, in which each piece of web material is not necessarily aligned linearly with the casing. The pieces of interior web material may be treated as in the first embodiment to form involutions. These pieces taken together extend from one end of the casing to the other, and have interstitial spaces of sufficient size and shape to take up the liquid by capillarity and surface tension effects to enhance wicking of liquid into the interstitial spaces.

Figure 4:
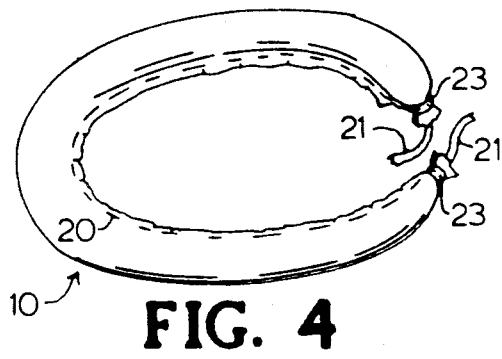
FIG. 4 is a perspective view of an elongated sorptive element of the invention placed in a manner to partially encircle a fluid to be taken up by the sorptive element.

The elongated sorptive element of the elongated casing 12 of the invention may be made in any length for a variety of absorptive purposes. When the sorptive element 10 is bent into a circular form as shown in FIG. 4, it may surround a spill area. Thus, as with the prior PIG ® sock, the long sorptive element 10 may be placed around or adjacent to a spill or drip area to enclose the fluid or stop it from spreading.

Figure 5:
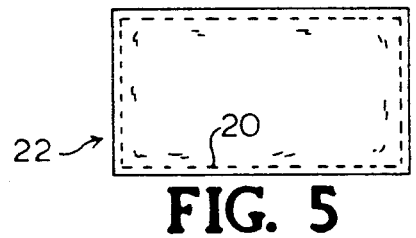
FIG. 5 is a perspective view of a flattened rectangular sorptive element of the invention according to the fourth embodiment.
Figure 6:
FIG. 6 is a side view of the sorptive element of FIG. 5.

In a fourth embodiment of the invention (FIGS. 5-6), the casing 12 when folded over the interior web material forms a flattened sorptive element 22 which may be rectangular, rounded or any other desired shape. For ease of construction of a rectangular flattened sorptive element 22, the sheet of fibrous web material used for the flattened casing 22 may be rectangular, and when folded over the interior web material forms a rectangular sorptive article as shown in FIG. 5. Other casing forms including fanciful design shapes may also be made. The sorptive article of this embodiment may be used to wipe up spills or to place over a spill to take up the liquid and, as discussed in more detail below, may be reused after removal from the article of liquids that were previously taken up.

Figure 7:
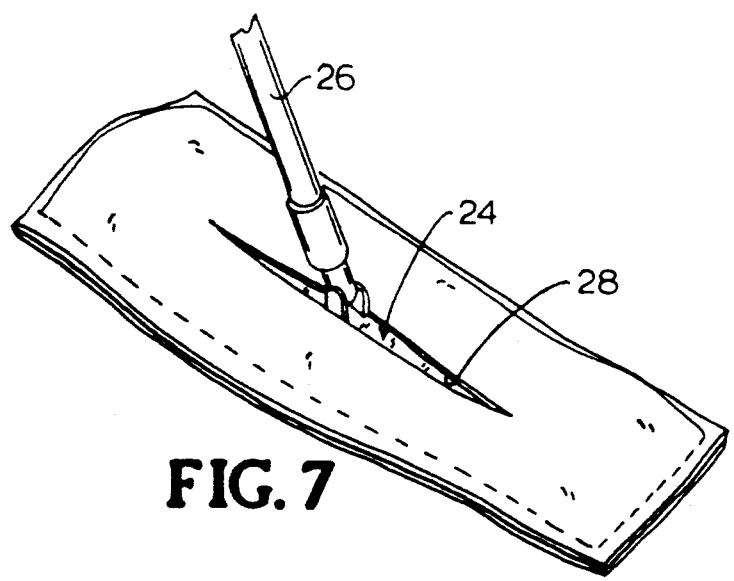
FIG. 7 is a perspective view of a sorptive element of the invention modified to allow attachment of a mop handle.

The top rectangular piece of casing 12 in the flattened sorptive element of the fourth embodiment or the backing of the sixth embodiment (see below) may have an attached mop handle fixture 24 (located within the casing 12 as shown by the arrow extending from the numeral 24 in FIG. 7, or exterior to the casing 12) as is known in the art, so that, for example, a rectangular three-way swivel handle 26 may be attached to the back of the sorptive element. FIG. 7 shows a handle attachment through a slit 28 in the surface of the sorptive element that is uppermost when the element is used as a mop.

The fifth embodiment of the invention comprises any of the other embodiments of the invention in which one or more sides of the casing is left open (is not stitched shut) so that in addition to sorption through the casing 12, fluids may come into the casing 12 directly without passing through the casing 12. For example, the figures showing partial sections of the first two embodiments (FIGS. 1 and 2) may also represent elongated casings having one open end.

Figure 8:
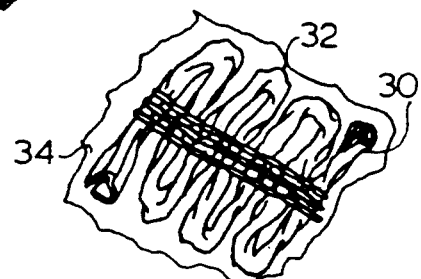
FIG. 8 is a partial view of strands of web elements sewn together as in the sixth embodiment of the invention.
Figure 9:
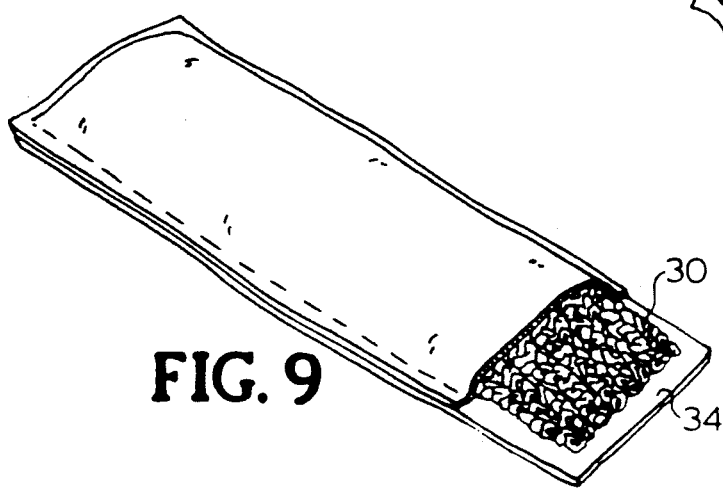
FIG. 9 is a perspective view of the sorptive element according to the sixth embodiment of the invention, having a portion of the casing broken away to show the linear strands.
Figure 10:
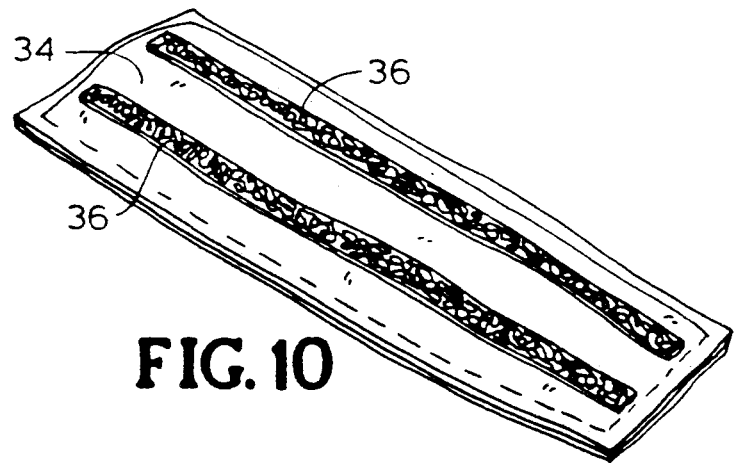
FIG. 10 is a perspective view of the upper (back) surface of the sorptive element of the sixth embodiment of the invention.

In the sixth embodiment, linear strands 30 of involuted web elements are sewn or otherwise attached to a dry-mop backing. In one preferred arrangement, successive rows of two or more linear strands 30 are folded in consecutive hairpin turns 32 and sewn to the backing 34 across the center of the length of each strand extending between the turns (FIGS. 8 and 9). The backing 34 is preferably any firm substance to assist in attaching the linear strands and in removing liquid from the dry mop. A pin-hole perforated plastic or a sturdy nonwoven substance may be used for the backing 34. For attachment of a dry mop handle, Velcro TM strips 36 or other attachment means may be fastened to the backing 34 (FIG. 10). A casing of a sheet of nonwoven material may be placed over the looped linear strands 30 on the mop surface (shown in FIG. 9 in broken-away section).

Unlike most sorptive materials used for large spills, the sorptive element 10 of the invention, may be reused. The preferred fibrous web components, especially when arranged in a linear orientation as in the first and second embodiment, allow the sorptive element to be manually or mechanically stripped of retained fluids by sequentially compressing the sorptive element from one end to the other. Such compressing releases the maximum amount of fluid when it proceeds from the closed casing end to the open end. Although some fluids may remain in a previously used, stripped sorptive element, it may be profitably reused for additional liquid removal at a high efficiency until the web materials wear out and the sorptive element no longer holds together.

While the invention has been described with reference to specific embodiments thereof, it will be appreciated that numerous variations, modifications, and embodiments are possible, and accordingly, all such variations, modifications, and embodiments are to be regarded as being within the spirit and scope of the invention.

What is claimed:

1. A fluid-sorptive article comprising:
   (a) a casing member formed of a liquid permeable material; and
   (b) at least one fibrous web element interiorly disposed in the casing member to form interstitial spaces capable of holding fluids.

2. A fluid-sorptive article according to claim 1, wherein the casing is elongated.

3. A fluid-sorptive article according to claim 2, wherein the casing member is closed at both ends.

4. A fluid-sorptive article according to claim 2, wherein the casing member is open at one end.

5. A fluid-sorptive article according to claim 2, wherein said fibrous web elements extend the length of said casing member.

6. A fluid-sorptive article according to claim 1, wherein the fibrous web elements comprise discrete linear strands of fibrous web.

7. A fluid-sorptive article according to claim 1, wherein the fibrous elements comprise parallel sheets of fibrous web rolled together within the casing.

8. A fluid-sorptive article according to claim 1, wherein the fibrous elements are twisted within the casing.

9. A fluid-sorptive article according to claim 1, wherein the casing member comprises a nonwoven web material selected from the group consisting of polyester, rayon, olefin, acrylics, wood pulp, cotton and combinations thereof.

10. A fluid-sorptive article according to claim 9, wherein the casing member is comprised of approximately 40% polyester and approximately 60% of a substance selected from the group consisting of wood pulp, cotton, polyester, rayon, olefin, acrylics, and combinations thereof.

11. A fluid-sorptive article according to claim 9, wherein the casing member is comprised of approximately 40% polyester and approximately 60% of a substance selected from the group consisting of natural fibers, synthetic fibers, and combinations thereof.

12. A fluid-sorptive article according to claim 9, wherein the casing member comprises a spun-laced fabric.

13. A fluid-sorptive article according to claim 1, wherein the casing member comprises a nonwoven web material comprising synthetic fibers.

14. A fluid-sorptive article according to claim 1, wherein said fibrous web element comprises a nonwoven material selected from the group consisting of polyester, rayon, olefin, acrylics, wood pulp, and combinations thereof.

15. A fluid-sorptive article according to claim 14, wherein the fibrous web element is comprised of approximately 40% polyester and approximately 60% of a substance selected from the group consisting of wood pulp, cotton, polyester, rayon, olefin, acrylics, and combinations thereof.

16. A fluid-sorptive article according to claim 14, wherein the fibrous web element is comprised of approximately 40% polyester and approximately 60% of a substance selected from the group consisting of natural fibers, synthetic fibers, and combinations thereof.

17. A fluid-sorptive article according to claim 14, wherein the fibrous web element is a hydro-entangled spun-laced fabric.

18. A fluid-sorptive article according to claim 1, wherein said fibrous web element comprises a nonwoven web material comprising synthetic fibers.

19. A fluid-sorptive article according to claim 1, wherein the article is flat and not elongated.

20. A fluid-sorptive article according to claim 19, wherein each of the fibrous web elements is formed into a plurality of folded portions and is sewn at multiple places to a portion of the casing.

21. A fluid-sorptive article according to claim 19, further comprising a mop handle attachment area on a flat side of the article.

22. A fluid-sorptive article according to claim 1, further comprising one or more foam pieces within the casing member.

* * * * *